(12) United States Patent
Murar et al.

(10) Patent No.: US 6,881,296 B2
(45) Date of Patent: Apr. 19, 2005

(54) METHOD AND SYSTEM FOR MANUFACTURING AN AIR BAG COVER ASSEMBLY INCLUDING A SWITCH

(75) Inventors: Jason T. Murar, Clinton Township, MI (US); John F. Murphy, Imlay City, MI (US)

(73) Assignee: Patent Holding Company, Fraser, MI (US)

( * ) Notice: Subject to any disclaimer, the term of this patent is extended or adjusted under 35 U.S.C. 154(b) by 283 days.

(21) Appl. No.: 09/996,430

(22) Filed: Nov. 20, 2001

(65) Prior Publication Data

US 2002/0053396 A1 May 9, 2002

Related U.S. Application Data

(63) Continuation of application No. 09/305,531, filed on May 5, 1999, now Pat. No. 6,579,402.

(51) Int. Cl.[7] .............................................. B32B 31/28
(52) U.S. Cl. ................... 156/379.8; 156/380.9; 156/580; 425/508; 219/494; 219/521
(58) Field of Search ............................. 156/580, 379.6, 156/379.8, 380.9; 425/508; 264/481, 492, 249; 219/482, 494, 521; 280/728.3, 731, 732

(56) References Cited

U.S. PATENT DOCUMENTS

| | | | |
|---|---|---|---|
| 3,383,265 A | | 5/1968 | Garabedian |
| 3,549,451 A | | 12/1970 | Kugler |
| 4,096,306 A | | 6/1978 | Larson |
| 4,265,954 A | | 5/1981 | Romanek |
| 4,767,298 A | * | 8/1988 | Bocchicchio et al. ....... 425/112 |
| 5,062,661 A | | 11/1991 | Winget |
| 5,151,149 A | * | 9/1992 | Swartz .................... 156/379.8 |
| 5,228,108 A | | 7/1993 | Motev et al. |
| 5,244,525 A | | 9/1993 | Neuwirth et al. |
| 5,399,819 A | | 3/1995 | Lang et al. |
| 5,444,814 A | | 8/1995 | Hofius |
| 5,465,998 A | | 11/1995 | Davis |
| 5,486,252 A | | 1/1996 | Wong |
| 5,487,557 A | | 1/1996 | Eckhout |
| 5,520,412 A | | 5/1996 | Davis |
| 5,522,954 A | | 6/1996 | Bennett et al. |
| 5,542,694 A | | 8/1996 | Davis |
| 5,549,323 A | | 8/1996 | Davis |
| 5,558,364 A | | 9/1996 | Davis |
| 5,642,901 A | | 7/1997 | Bowman et al. |
| 5,685,561 A | | 11/1997 | Kauer |

(Continued)

Primary Examiner—John T. Haran
(74) Attorney, Agent, or Firm—Brooks Kushman, P.C.

(57) ABSTRACT

A method and system of manufacturing an air bag cover assembly utilizing infrared radiation is disclosed. The assembly includes a front panel, a back plate, a switch and infrared-absorbing material. Initially, the front panel and the back plate are positioned so that inner surfaces of the front panel and the back plate define a switch pocket therebetween. Then the switch is positioned in the switch pocket. Thereafter, infrared radiation is directed at the infrared-absorbing material for a time sufficient to heat the infrared-absorbing material to a desired temperature. The amount of heat applied to the infrared-absorbing material by the infrared radiation is controlled by a controller. Finally, the heated material cools to fixedly secures the back plate to the front panel. The heated material may be forced to flow prior to cooling. In one embodiment, the back plate includes a plurality of spaced holes extending therethrough and wherein the infrared-absorbing material forms a plurality of stakes connected to the inner surface of the front panel and extending through the plurality of spaced holes. The heated infrared-absorbing material forms a plurality of solid connectors after cooling. In another embodiment, the infrared-absorbing material is a heat-activated adhesive and the method further includes applying the heat-activated adhesive to at least one of the inner surfaces of the front panel and the back plate.

8 Claims, 2 Drawing Sheets

U.S. PATENT DOCUMENTS

| | | |
|---|---|---|
| 5,743,408 A | 4/1998 | Hill |
| 5,743,982 A | 4/1998 | Marfilius et al. |
| 5,750,970 A | 5/1998 | Chaffin |
| 5,760,379 A | 6/1998 | Matsen et al. |
| 5,840,147 A * | 11/1998 | Grimm .................... 156/272.2 |
| 5,858,159 A | 1/1999 | Holbrook et al. |
| 6,099,291 A * | 8/2000 | Lanser ....................... 425/508 |
| 6,251,202 B1 * | 6/2001 | Murphy ....................... 156/64 |

* cited by examiner

METHOD AND SYSTEM FOR MANUFACTURING AN AIR BAG COVER ASSEMBLY INCLUDING A SWITCH

CROSS REFERENCE TO RELATED APPLICATION

This application is a continuation of application Ser. No. 09/305,531 filed on May 5, 1999, now issued as U.S. Pat. No. 6,579,402, which is related to U.S. Pat. No. 6,251,202 entitled "Method and System For Bonding Plastic Parts Together" issued on Jun. 26, 2001 and filed on the same date as the parent application.

TECHNICAL FIELD

This invention relates to methods and systems for manufacturing air bag cover assemblies and, more particularly, to methods and systems for manufacturing air bag cover assemblies including switches utilizing infrared radiation.

BACKGROUND ART

When one wishes to attach plastic parts together, several processes exist to accomplish this. Among them are methods such as hot air bonding, sonic welding, vibration welding, adhesives, mechanical fasteners and infrared radiant heat.

U.S. Pat. No. 5,750,970 discloses a method of dielectrically heating an adhesive which, in turn, bonds plastic parts together.

Infrared radiant heat has certain advantages over the other types of processes. Generally, there is a desire to form a strong bond between the two parts quickly at a minimal cost. Additionally, it is preferable that during the bonding process nothing touches the surfaces to be bonded in order to assure uniform bonds from part-to-part and to reduce the cost of cleaning the bonding apparatus. Further, in many instances, it is preferable that no marring or distortion occur on the surface opposite the surface which is bonded. This surface is referred to as the "viewing" or "class A" surface.

Infrared bonding, in general, can overcome many of these concerns. Infrared energy can be finitely pinpointed with a focal point or a mask to the exact area to be bonded in order to avoid overheating the plastic in adjacent areas that might cause unwanted distortion in the part. Infrared energy can heat the bonding surface to a high temperature, thus assuring that a strong bond is formed between the two parts. The bonding surface can be heated very quickly with infrared energy and the timing and amount of heat application can be precisely controlled. Further, with infrared heating, there need be no contact between the heat source and the bonding surfaces of the parts, in order to minimize cleaning requirements for the tooling.

Nonetheless, there are some drawbacks, in general, to using infrared heat to bond plastic parts together. In the case of automotive interior parts, for example, there are many parts made of plastic that are bonded to another part, but also need to have their viewing surfaces as distortion and mar free as possible since occupants of the vehicle will be able to see the surfaces. However, in the general application of focused infrared heat on the bonding surface in such applications, the "class A" surface is oftentimes damaged. The finite focal point, while avoiding overheating adjacent areas, is too intense and harms many plastic parts during the heating process. An inherent difficulty to overcome in working with infrared radiant heat to bond plastic is to heat the bonding surfaces sufficiently without causing warpage, burning or marring of the "class A" surfaces.

U.S. Pat. Nos. 3,383,265; 3,549,451; 4,265,954; 5,151,149; 5,244,525; 5,444,814 and 5,522,954 all disclose the use of infrared energy to bond or join plastic or polymeric materials together. The '954 patent discloses the bonding of plastic interior automatic parts having "class A" surfaces after each surface is exposed to infrared heat from an infrared heat source positioned between the surfaces.

U.S. Pat. No. 4,096,306 discloses a method of forming air-inflated cushioning material using two heat sealable films with air passages therebetween, which may be fused by "infrared black line sealing."

U.S. Pat. Nos. 5,062,661; 5,487,557; 5,465,998; 5,549,323; 5,558,364; 5,520,412; 5,542,694; 5,399,819; and 5,522,954 disclose a variety of heat-staking and hot plate welding techniques with respect to automotive air bag covers.

Securing back plates to front panels of plastic air bag covers present unique problems especially since the space between the front panel and the back plate defines a critical gap in which a membrane switch is positioned prior to the staking process. The size of the gap is critical to ensure proper switch actuation, which most often takes the form of a horn actuation. Furthermore, the back plate must be secured to the front panel so that the back plate does not separate from the front panel during air bag deployment within an automotive interior temperature range of −30° C. to 80° C.

U.S. Pat. No. 5,685,561 discloses the induction welding of a back plate to the back side of an air bag cover.

U.S. Pat. No. 5,642,901 discloses a relatively flexible thermoplastic air bag cover including a front panel wherein switch-activating members enhance activation of a membrane-type switch located at a switch location area of the front panel.

One prior art staking process used hot air to melt rearwardly extending stakes from the front panel onto the back plate. However, the hot air also tends to: 1) deform the "class A" surface of the front panel; 2) deform the switch membrane due to the hot air flow into the critical gap; and 3) deform the back plate, thereby changing the dimensions of the critical gap.

The use of heat-activated adhesive to bond parts together is shown by the following U.S. Pat. Nos.: 5,228,108; 5,743,982; 5,486,252; 5,858,159; and 5,743,408.

DISCLOSURE OF INVENTION

An object of the present invention is to provide a method and system for manufacturing an air bag cover assembly including a switch quickly and inexpensively without introducing deformities into the resulting assembly.

Another object of the present invention is to provide a method and system for manufacturing an air bag cover assembly including a switch using infrared radiation.

Yet another object of the present invention is to provide a method and system for manufacturing an air bag cover assembly including a switch without introducing deformities into the outer "class A" surface of a front panel, the switch, or a back plate while at the same time, ensuring that the back plate remains attached to the front panel during air bag deployment, (i.e. temperature range of −30° C. to 80° C.).

In carrying out the above objects and other objects of the present invention, a method of manufacturing an air bag cover assembly is provided. The method includes providing a front panel, a back plate, a switch and infrared-absorbing material. The method also includes positioning the front panel and the back plate so that inner surfaces of the front panel and the back plate define a switch pocket therebetween. Then the method includes positioning the switch in the switch pocket. The method further includes directing infrared radiation at the infrared-absorbing material for a time sufficient to heat the infrared-absorbing material to a desired temperature. The method includes controlling the amount of heat applied to the infrared-absorbing material by the infrared radiation and cooling the heated infrared-absorbing material. The cooled material fixedly secures the back plate to the front panel.

Preferably, the method further includes the step of forcing the heated infrared-absorbing material to flow prior to the step of cooling.

Still further in carrying out the above objects and other objects of the present invention, a system is provided for manufacturing an air bag cover assembly including a front panel, a back plate, a switch and infrared-absorbing material. The system includes an infrared lamp for emitting infrared radiation and a base having a fixture mounted thereon for receiving and retaining the front panel and the back plate so that inner surfaces of the front panel and the back plate define a switch pocket therebetween. The system further includes a controller coupled to the infrared lamp for controlling power supplied to the infrared lamp so that the infrared lamp emits infrared radiation at the infrared-absorbing material for a time sufficient to heat the infrared-absorbing material to a desired temperature. The heated infrared-absorbing material bonds the plastic parts together when cooled.

The system may include a mechanism mounted for movement relative to the base for forcing the heated infrared-absorbing material to flow.

In one embodiment, the back plate includes a plurality of spaced holes extending therethrough and the infrared-absorbing material forms a plurality of stakes connected to the inner surface of the front panel and extending through the plurality of spaced holes. The heated infrared-absorbing material forms a plurality of solid connectors when cooled.

In another embodiment, the infrared-absorbing material is a heat-activated adhesive and the method further includes applying the adhesive to at least one of the inner surfaces.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
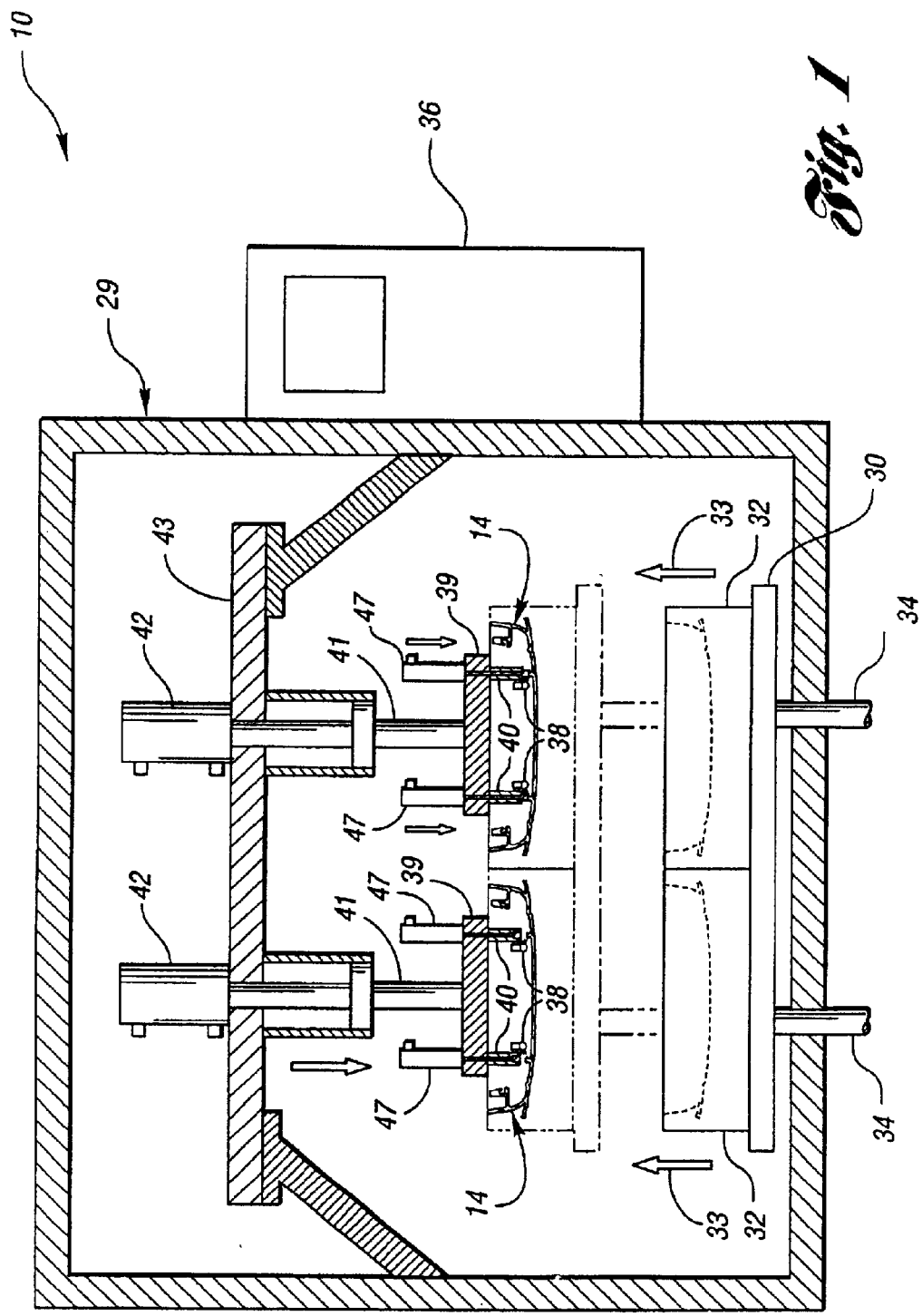
FIG. 1 is a side schematic view, partially broken away and in cross-section, of a system of the present invention for manufacturing an air bag cover assembly including a switch.
Figure 2:
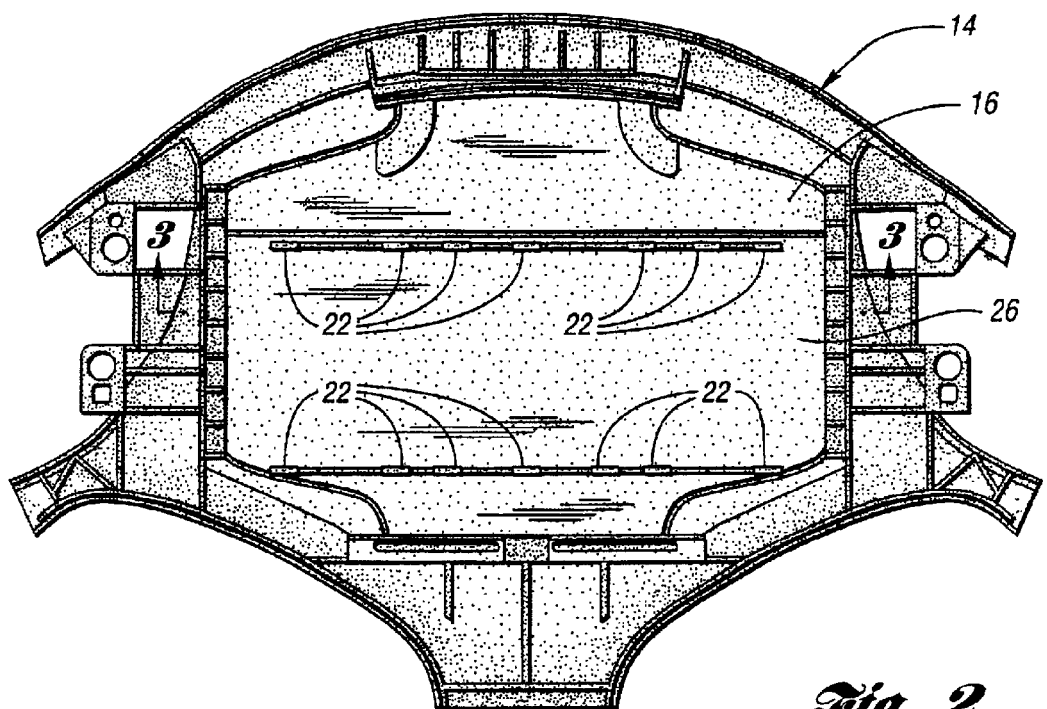
FIG. 2 is a back view of an air bag cover prior to securing a back plate and a switch thereto.
Figure 3:
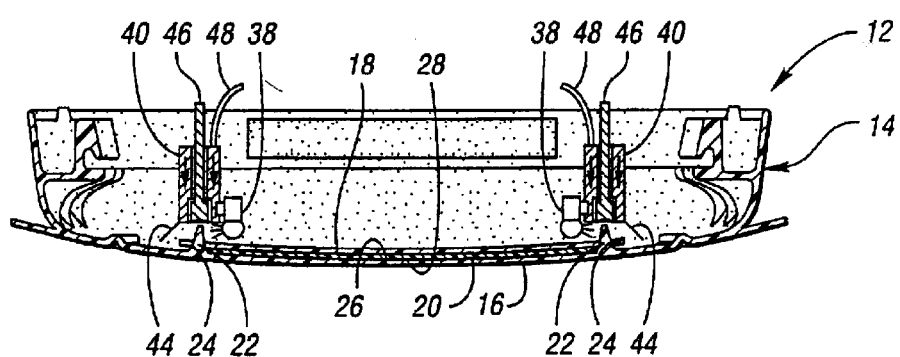
FIG. 3 is a sectional view, taken along lines 3—3 of FIG. 2 during attachment of a back plate and switch to a front panel of the air bag cover.
Figure 4:
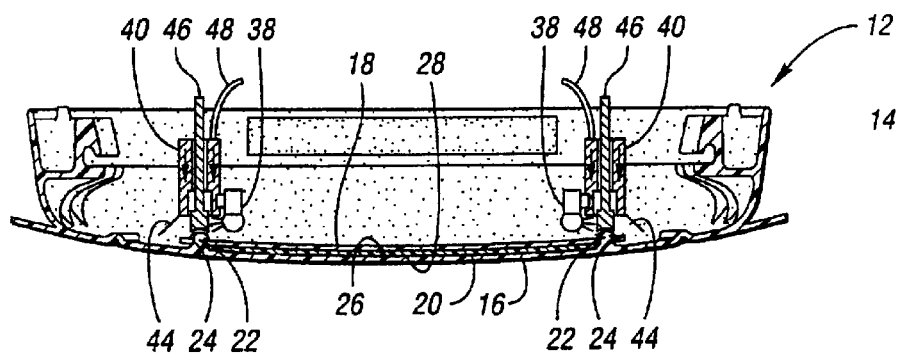
FIG. 4 is a view similar to FIG. 3 during a staking operation.

Referring now to FIG. 1, there is illustrated a system, generally indicated at 10, for manufacturing an air bag cover assembly, generally indicated at 12 in FIGS. 3 and 4. The assembly 12 typically includes an air bag cover, generally indicated at 14, having a front panel 16. The assembly 12 also includes a back plate 18, a switch in the form of a membrane switch 20 and infrared-absorbing material in the form of a plurality of stakes 22 connected to the inner surface 26 of the front panel 16. The stakes 22 extend through the plurality of spaced holes 24 formed completely through the back plate 18.

Inner surfaces 26 and 28 of the front panel 16 and the back plate 18, respectively, define a switch pocket therebetween and in which the switch 20 is positioned.

As illustrated in FIG. 1, the system 10 includes a frame structure, generally indicated at 29, and a base, generally indicated at 30, which has a pair of fixtures 32 mounted thereon for movement therewith from their solid line position to their phantom line position in the direction of arrows 33. The base 30 is moved by rods 34 which are connected to air cylinders (not shown) under control of a controller 36. The controller 36 may be a programmable controller or a microprocessor-based controller. The controller 36 may have stored therein data which represents various times and sequential events for use in controlling the various devices described herein. For example, time data may be stored therein based on the amount of time and power for energizing infrared lamps described hereinbelow. Each fixture 32 is adapted to receive and retain one air bag cover 14 therein.

In the upper position of the fixtures 32 as illustrated in FIG. 1, the air bag covers 14 are supported immediately adjacent infrared energy sources in the form of infrared lamps 38, as best shown in FIGS. 3 and 4. The lamps 38 emit infrared radiation at the infrared-absorbing stakes 22 for a time sufficient to heat and melt the infrared-absorbing stakes 22 to a desired temperature to obtain molten material.

The lamps 38 are fixedly mounted to respective housings 40 which, in turn, are mounted for reciprocating motion with their respective plates 39. Each plate is secured for movement at one end of a rod 41 of an air cylinder 42. The air cylinders 42 are supported on a horizontal plate 43 of the frame structure 29.

Shields 44 fixedly secured to their respective housings 40 are provided for shielding the infrared radiation from the rest of the air bag cover 14.

Staking pistons 46 are mounted for reciprocating movement within the housings 40. The pistons 46 are connected to linear actuators 47 which are also fixedly secured to the plates 39. Each of the actuators 47 is also under control of the controller 36.

When the pistons 46 are extended by their actuators 47 to their positions as shown in FIG. 4 to stake the stakes 22, cooling air flows through hoses 48 which extend through the plate 39 and the housings 40 to cool the molten material shaped by the ends of the pistons 46 to form solid connectors which fixedly secure the back plate 18 to the front panel 16. In other words, the ends of the pistons 46 force the molten material to flow prior to cooling by the cooling air. The cooling air is typically applied by blowers (not shown) also under control of the controller 36.

Process of Manufacturing the Air Bag Cover Assembly 12

1. Initially put the air bag covers 14 into nests formed in the fixtures 32;
2. Put the horn switches 20 and backing plates 18 into each cover 14 so that the switches 20 are positioned in switch pockets and the stakes 22 extend through holes 24 formed through the back plates 18;
3. Initiate assembly sequence wherein the base 30 together with the fixtures 32 are raised by the rods 34 under control of the controller 36;

4. The unassembled assemblies 12 contained within the fixtures 32 index upwards to the stake operation;

5. Initiate infrared heat cycle—timed under control of the controller 36 to melt stakes 22;

6. Initiate cold stake process—timed under control of the controller 36 to form the stakes 22; and 7. Remove assemblies 12 after the base 30 is lowered by the rods 34 and inspect.

Alternatively, instead of the stakes 22, the infrared-absorbing material may take the form of a heat-activated adhesive typically applied in liquid form to one or both of the inner surfaces 26 and 28 of the front panel 16 and the back plate 18, respectively, about the switch pocket in which the switch 20 is positioned. The infrared radiation from the lamps 38 travels or propagates through the back plate 18 and is absorbed by the adhesive for a time sufficient to heat the adhesive to a desired temperature at which the adhesive is activated. The adhesive, when cooled, fixedly secures the back plate 18 to the front panel 16. In this way, a much cheaper adhesive than what is conventionally used may be employed to secure or bond the plastic parts together. Details of this alternative method and system are found in the above-noted application entitled "Method And System For Bonding Plastic Parts Together" now issued as U.S. Pat. No. 6,251,202, which is hereby incorporated by reference in its entirety.

While the best mode for carrying out the invention has been described in detail, those familiar with the art to which this invention relates will recognize various alternative designs and embodiments for practicing the invention as defined by the following claims.

What is claimed is:

1. A system of manufacturing an air bag cover assembly including a plastic front panel, a plastic back plate, a switch and infrared-absorbing material, the system comprising:

at least one housing having a respective infrared lamp for emitting infrared radiation and an infrared shield for shielding the plastic front panel from the infrared radiation;

a base including a fixture mounted thereon for receiving and retaining the front panel and the back plate so that inner surfaces of the front panel and the back plate define a switch pocket therebetween;

an apparatus for staking the infrared-absorbing material; and a controller coupled to the at least one infrared lamp for controlling power supplied to the at least one infrared lamp so that the at least one infrared lamp emits infrared radiation at the infrared-absorbing material when the infrared-absorbing material is disposed between the at least one infrared lamp and infrared shield for a time sufficient to heat the infrared-absorbing material to a desired temperature, wherein the heated infrared-absorbing material bonds the plastic front panel and back plate together when cooled without introducing deformities into outer class A surfaces of the plastic front panel.

2. The system as claimed in claim 1 wherein the apparatus for staking the infrared-absorbing material is mounted for movement relative to the base for forcing the heated infrared-absorbing material to flow.

3. The system as claimed in claim 1 wherein the back plate includes a plurality of spaced holes extending therethrough and wherein the infrared-absorbing material forms a plurality of stakes that are staked by the apparatus for staking the infrared-absorbing material, connected to the inner surface of the front panel and extending through the plurality of spaced holes and wherein the heated infrared-absorbing material forms a plurality of solid connectors when cooled.

4. The system as claimed in claim 1 wherein the apparatus for staking the infrared-absorbing material comprises at least one piston.

5. The system as claimed in claim 1 wherein the cooling is performed using a blower coupled to and controlled by the controller.

6. A system of manufacturing an air bag cover assembly including a plastic front panel, a plastic back plate, a switch and infrared-absorbing material, the system comprising:

at least one housing having a respective infrared lamp for emitting infrared radiation and an infrared shield for shielding the plastic front panel from the infrared radiation;

a base including a fixture mounted thereon for receiving and retaining the front panel and the back plate so that inner surfaces of the front panel and the back plate define a switch pocket therebetween;

an apparatus for staking the infrared-absorbing material; and a controller coupled to the at least one infrared lamp for controlling power supplied to the at least one infrared lamp so that the at least one infrared lamp emits infrared radiation at the infrared-absorbing material when the infrared-absorbing material is disposed between the at least one infrared lamp and infrared shield for a time sufficient to heat the infrared-absorbing material to a desired temperature, and coupled to linear actuators that are connected to the apparatus for staking the infrared-absorbing material and controlled by the controller, wherein the heated infrared-absorbing material bonds the plastic front panel and back plate together when cooled without introducing deformities into outer class A surfaces of the plastic front panel.

7. The system as claimed in claim 6 wherein the apparatus for staking the infrared-absorbing material comprises at least one piston.

8. The system as claimed in claim 6 wherein the cooling is performed using a blower coupled to and controlled by the controller.

* * * * *